US011047309B2

United States Patent
Fiedler et al.

(10) Patent No.: US 11,047,309 B2
(45) Date of Patent: Jun. 29, 2021

(54) METHOD AND SYSTEM FOR DETECTING AN ABNORMAL ENGINE START

(71) Applicant: PRATT & WHITNEY CANADA CORP., Longueuil (CA)

(72) Inventors: Andrzej Fiedler, Oakville (CA); Michael Krynski, Waterdown (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 574 days.

(21) Appl. No.: 15/659,722

(22) Filed: Jul. 26, 2017

(65) Prior Publication Data
US 2019/0032560 A1 Jan. 31, 2019

(51) Int. Cl.
*F02C 7/26* (2006.01)
*F01D 21/12* (2006.01)

(52) U.S. Cl.
CPC ............ *F02C 7/26* (2013.01); *F01D 21/12* (2013.01); *F05D 2270/303* (2013.01); *F05D 2270/304* (2013.01)

(58) Field of Classification Search
CPC ........ F02C 7/26; F02C 9/28; F05D 2270/042; F05D 2270/112; F05D 2270/303
See application file for complete search history.

(56) References Cited

U.S. PATENT DOCUMENTS

| | | | |
|---|---|---|---|
| 5,101,619 A | * | 4/1992 | Morris ............... F02C 7/26 60/778 |
| 5,622,045 A | | 4/1997 | Weimer et al. |
| 5,907,949 A | * | 6/1999 | Falke ................. F02C 7/26 60/779 |
| 7,322,178 B2 | | 1/2008 | Simoni |
| 7,509,810 B2 | | 3/2009 | Smith et al. |
| 2016/0123232 A1 | | 5/2016 | Wright et al. |
| 2016/0368612 A1 | | 12/2016 | Xiong et al. |

* cited by examiner

*Primary Examiner* — Katheryn A Malatek
(74) *Attorney, Agent, or Firm* — Norton Rose Fulbright Canada LLP

(57) ABSTRACT

Herein provided are methods and systems for detecting an abnormal engine start of a gas turbine engine. An inter-turbine temperature of the engine is measured during engine start. The inter-turbine temperature is compared to an inter-turbine temperature threshold which depends on at least one additional parameter. An abnormal engine start is detected when the inter-turbine temperature exceeds the threshold. The at least one additional parameter may comprise engine rotational speed. The at least one additional parameter may comprise time.

18 Claims, 4 Drawing Sheets

METHOD AND SYSTEM FOR DETECTING AN ABNORMAL ENGINE START

TECHNICAL FIELD

The present disclosure relates generally to gas turbine engines, and more particularly to detecting an abnormal engine start.

BACKGROUND OF THE ART

When an engine starts abnormally, this may lead to distress and/or damage to the engine. To address this issue, engine control systems sometimes measure the temperature of an engine during the engine start using a temperature probe. In the event that the temperature of the engine exceeds a specific value, the engine is shut down by the engine control system.

However, the temperature probe may not be able to obtain an accurate temperature measurement until the engine is idling. As such, by the time a temperature measurement of the engine exceeds the specific value during an abnormal engine start, the engine may have already been distressed and/or damaged.

As such there is room for improvement.

SUMMARY

In one aspect, there is provided a method for detecting an abnormal engine start of a gas turbine engine. The method comprises monitoring an inter-turbine temperature of the engine during engine start; comparing the inter-turbine temperature to an inter-turbine temperature threshold which depends on at least one additional parameter; and detecting an abnormal engine start when the inter-turbine temperature exceeds the threshold.

In another aspect, there is provided a system for detecting an abnormal engine start of a gas turbine engine. The system comprises a processing unit and a non-transitory computer-readable memory having stored thereon program instructions executable by the processing unit. The program instructions executable by the processing unit are for monitoring an inter-turbine temperature of the engine during engine start; comparing the inter-turbine temperature to an inter-turbine temperature threshold which depends on at least one additional parameter; and detecting an abnormal engine start when the inter-turbine temperature exceeds the threshold.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
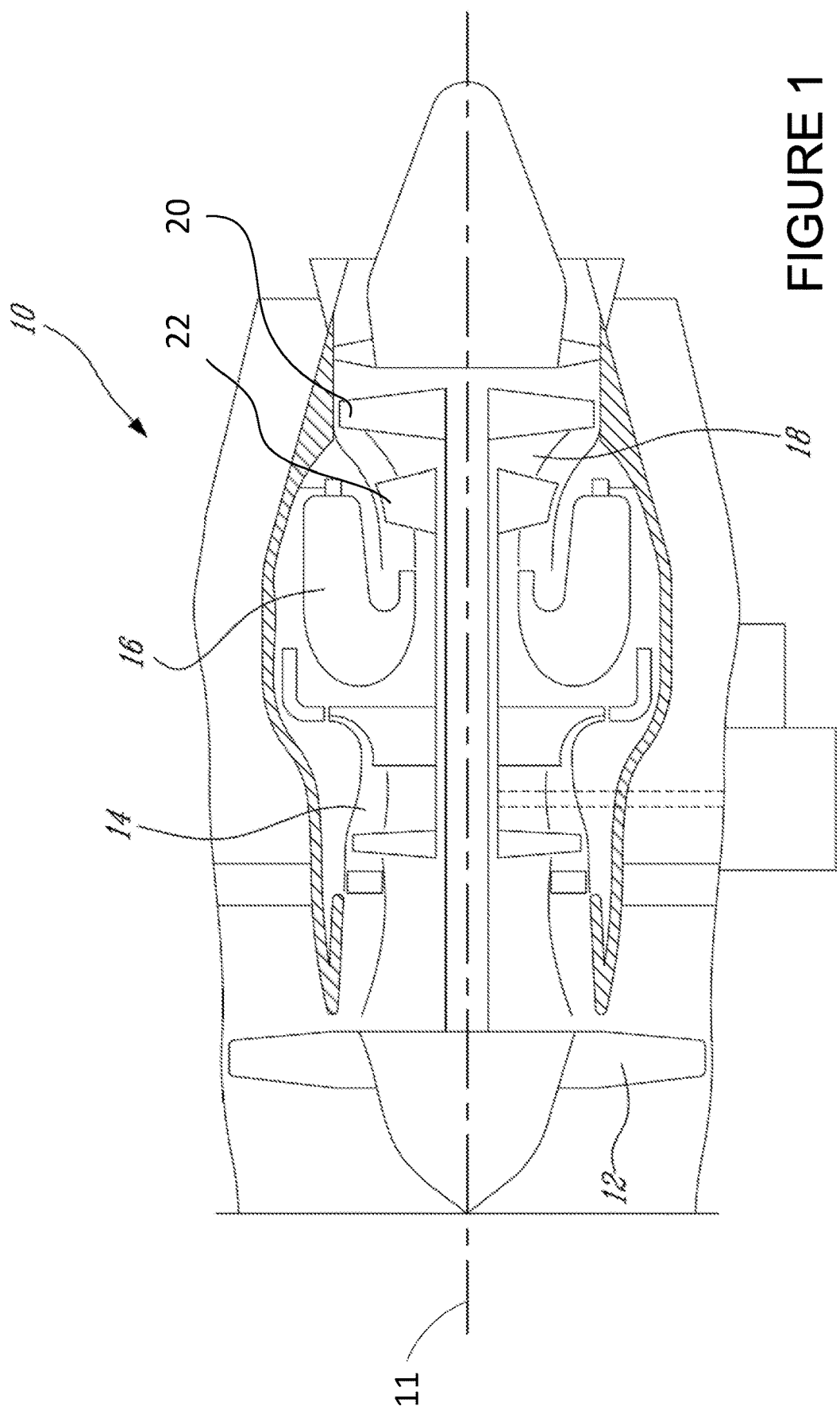
FIG. 1 is a schematic of an example gas turbine engine.

FIG. 1 illustrates a gas turbine engine 10 for which an abnormal engine start may be detected using the methods and systems described herein. Note that while engine 10 is a turbofan engine, the methods and systems for detecting an abnormal engine start may be applicable to turboprop, turboshaft, auxiliary power units (APU), and other types of aircraft engines.

Engine 10 generally comprises in serial flow communication: a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Axis 11 defines an axial direction of the engine 10.

Figure 2:
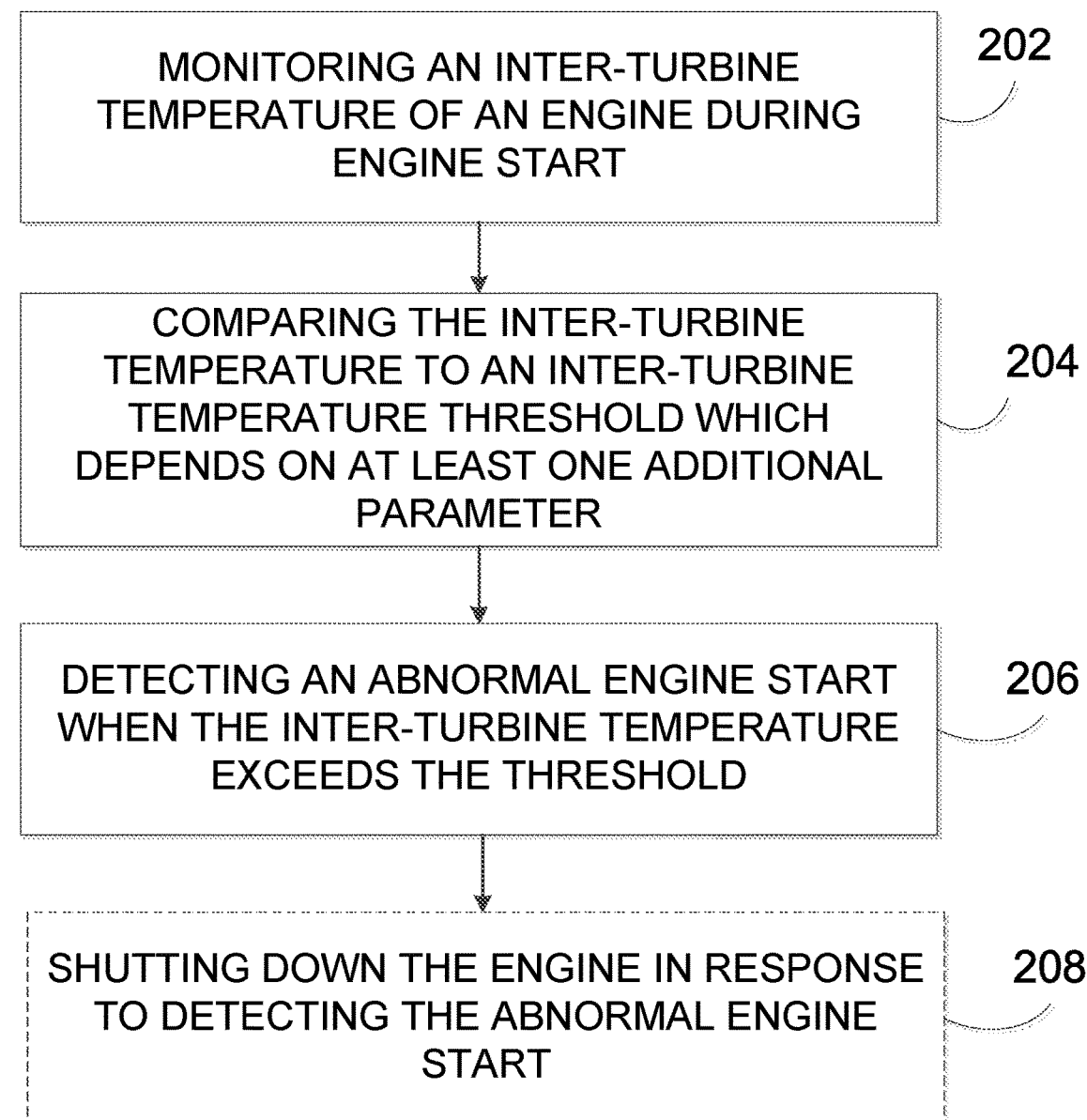
FIG. 2 is a flowchart illustrating an example method for detecting an abnormal start of a gas turbine engine in accordance with an embodiment.

With reference to FIG. 2, there is illustrated a flowchart of an example method 200 for detecting an abnormal engine start of a gas turbine engine, such as engine 10 of FIG. 1. While the method 200 is described herein with reference to the engine 10 of FIG. 1, this is for example purposes. The method 200 may be applied to other types of engines depending on practical implementations.

At step 202, an inter-turbine temperature of the engine is monitored during engine start. The inter-turbine temperature may be monitored by obtaining temperature measurements from a temperature measurement device comprising one or more temperature sensors. With reference to FIG. 1, in some embodiments, the one or more temperature sensors may be positioned between a low-pressure turbine 20 and a high-pressure turbine 22 of the turbine section 18. The location of the temperature sensors may vary depending on the practical implementation. The inter-turbine temperature may be dynamically measured in real time, or may be recorded regularly in accordance with any suitable time interval. Step 202 may comprises triggering measurements of inter-turbine temperature whenever method 200 is initiated.

Referring back to FIG. 2, at step 204, the inter-turbine temperature is compared to an inter-turbine temperature threshold which depends on at least one additional parameter. The at least one additional parameter may vary depending on practical implementations. In some embodiments, the at least one additional parameter comprises engine rotational speed. In some embodiments, the at least one additional parameter comprises time.

At step 206, an abnormal engine start is detected when the inter-turbine temperature exceeds the threshold. In some embodiments, when the abnormal engine start is detected, an indication of the abnormal engine start may be provided to the pilot, crew members and/or service crew.

In some embodiments, the method 200 comprises an optional step 208 of shutting down the engine 10 in response to detecting the abnormal engine start. For example, if an abnormal engine start is detected for a ground start, the engine 10 may automatically be shut down. Accordingly, the method 200 may be directed to a method for shutting down a gas turbine engine.

It should be appreciated that by having the inter-turbine temperature threshold which depends on at least one additional parameter, this reduces the risk of damage to the engine 10 which may have otherwise occurred if the inter-turbine temperature threshold was independent of additional parameters. The inter-turbine temperature threshold which depends on at least one additional parameter may be designed in a manner to reduce the risk of damage to the engine 10 compared to an independent temperature threshold.

In some embodiments, the inter-turbine temperature threshold depends on engine rotational speed (Ng). With additional reference to FIG. 3, an example inter-turbine temperature threshold 304 is illustrated that depends on the engine rotational speed. The inter-turbine temperature threshold 304 has a constant value 308 when the engine rotational speed of the engine 10 is within a first range 310 of engine rotational speeds. The inter-turbine temperature threshold 304 has no value when the engine rotational speed of the engine 10 is within a second range 330 of engine rotational speeds. As such, in this example, the inter-turbine temperature threshold 304 has a limit 320 based on engine rotational speed. The ranges 310, 330 may be defined in terms of a percentage of a maximum engine rotational speed of the engine 10. For example, the first range 310 may correspond to a range of 0% to N % and the second range 330 may correspond to a range of N % to 100%. Alternatively, the ranges 310, 330 may be defined in terms of an actual engine rotational speed (e.g., in revolutions per minute).

Figure 3:
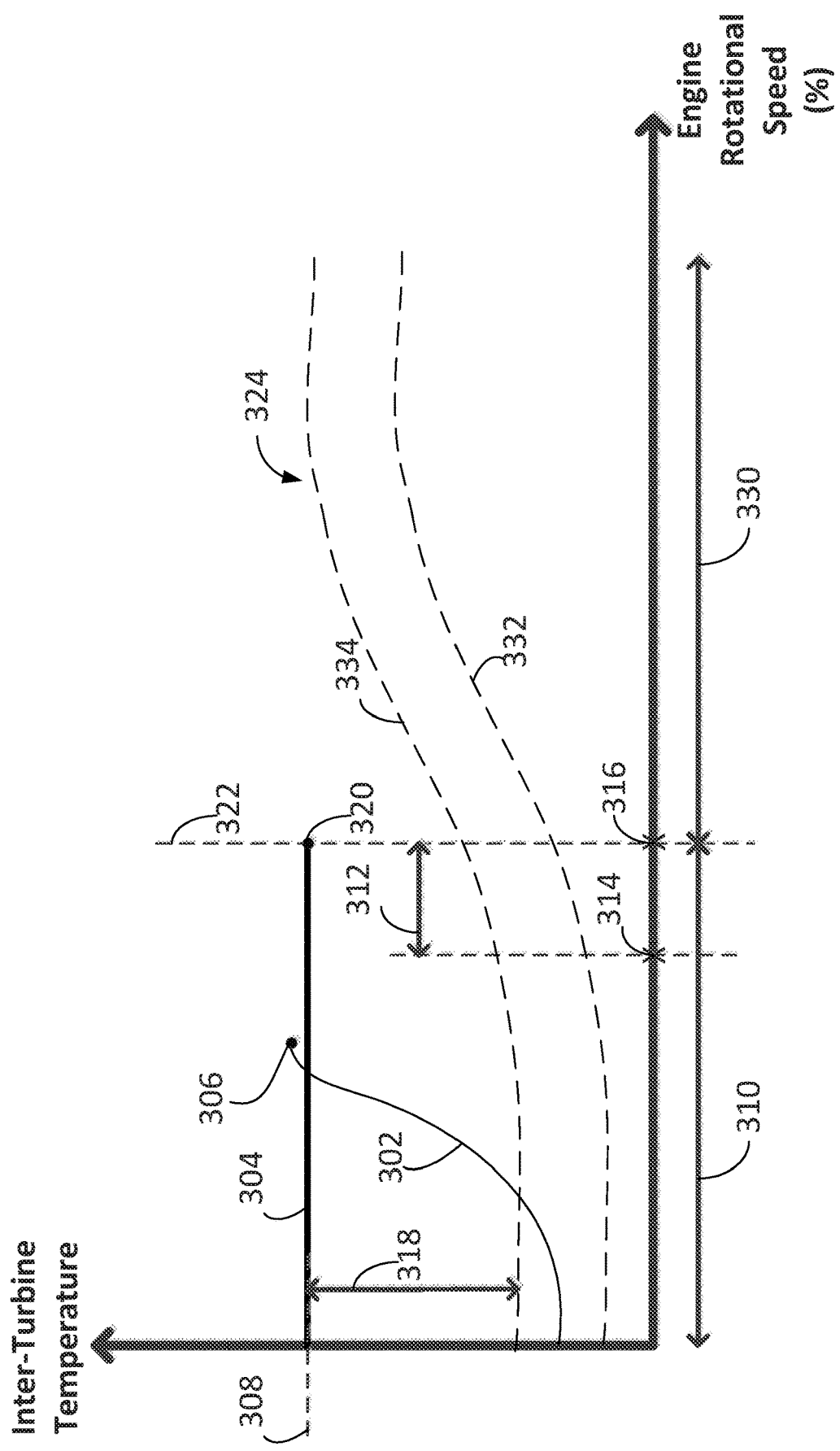
FIG. 3 is an example graphical representation of a threshold for detecting an abnormal engine start.

As shown in FIG. 3, a curve 302 illustrates a measurement of inter-turbine temperature of the engine 10 as a function of the engine rotational speed. The engine rotational speed may be monitored by obtaining rotational speed measurements from a rotational speed measurement device comprising one or more sensors. The rotational speed measurement device may comprise a tachometer, revolution-counter, and/or any other suitable device. Alternatively, the engine rotational speed is provided by an engine computer or an aircraft computer.

In this example, during the engine start, the inter-turbine temperature 302 is compared to the inter-turbine temperature threshold 304. As shown, the inter-turbine temperature 302 increases until a point 306 where it exceeds the inter-turbine temperature threshold 304. Accordingly, an abnormal engine start is detected when the inter-turbine temperature 302 exceeds the inter-turbine temperature threshold 304. In this example, the engine 10 is shut down in response to detecting the abnormal engine start and the curve 302 no longer illustrates the inter-turbine temperature after the engine 10 has been shut down.

In some embodiments, comparing the inter-turbine temperature 302 to the inter-turbine temperature threshold 304 comprises comparing the inter-turbine temperature 302 to the constant value 308 when the engine rotational speed of the engine is within the first range 310 of engine rotational speeds. For example, the engine rotational speed may be compared to an engine rotational speed threshold 322 for determining if the inter-turbine temperature 302 should be compared to the inter-turbine temperature threshold 304. Accordingly, while the engine rotational speed is below the engine rotational speed threshold 322, the inter-turbine temperature 302 may be compared to the inter-turbine temperature threshold 304. In this example, the engine rotational speed threshold 322 is defined by an endpoint 316 of the first range 310 of engine rotational speeds.

In some embodiments, the endpoint 316 of the first range 310 of engine rotational speeds is based on a first offset 312 from at least one operating characteristic of the engine 10. In some embodiments, the operating characteristic is an expected light-off engine rotational speed 314 of the engine 10. By way of a specific and non-limiting example, the expected light-off engine rotational speed 314 of the engine 10 is approximately 20% of the maximum engine rotational speed. By way of another specific and non-limiting example, the expected light-off engine rotational speed 314 of the engine 10 is in the range to 15 to 25% of the maximum engine rotational speed. Other values are contemplated, depending on implementation of the engine 10.

In some embodiments, the operating characteristic is an expected engine rotational speed where fuel is introduced into the engine 10. By way of a specific and non-limiting example, the engine rotational speed where fuel is introduced into the engine 10 is approximately 15% of the maximum engine rotational speed. By way of another specific and non-limiting example, the engine rotational speed where fuel is introduced into the engine 10 is in the range to 10 to 20% of the maximum engine rotational speed. Other values are contemplated, depending on implementation of the engine 10.

The inter-turbine temperature threshold 304 may be based on the expected light-off engine rotational speed 314 of the engine 10 and/or the expected engine rotational speed where fuel is introduced into the engine 10. For example, the engine rotational speed corresponding to the limit 320 of the inter-turbine temperature threshold 304 may be set based on the expected light-off engine rotational speed 314 of the engine 10 and/or the expected engine rotational speed where fuel is introduced into the engine 10.

In some embodiments, the inter-turbine temperature threshold 304 is determined based on a temperature profile 324 of the engine 10 as a function of engine rotational speed for acceptable engine starts. Acceptable engine starts may be determined as a function of various parameters, such as a range of aircraft altitudes and a range of ambient temperatures. The temperature profile 324 may be obtained by measuring and recording the temperature of the engine 10 as a function of engine rotational speed, during engine start, over a range of altitudes and a range of ambient temperatures. For example, the temperature of the engine 10 may be measured during engine start at a low altitude (e.g., below 1000 meters) and measured at a high altitude (e.g., above 2,400 meters). Similarly, the temperature of the engine 10 may be measured during engine start at a cold ambient temperature (e.g., below −30 degrees Celsius) and measured at a warm ambient temperature (e.g., above 25 degrees Celsius). Measurements at a combination of different altitudes and ambient temperatures may be done. The temperature profile 324 may be determined by setting a lower limit 332 and an upper limit 334 of the temperature profile 324. The lower limit 332 and the upper limit 334 may be set such that the temperature measurements of the engine 10 for the ranges of altitudes and ambient temperatures are between the lower limit 332 and the upper limit 334. Alternately, or in addition, the temperature profile 324 may be obtained by computer simulation that simulates the temperature of the engine 10 during start over a range of altitudes and ambient temperatures.

In some embodiments, the constant value 308 of the inter-turbine temperature threshold 304 is based on a second offset 318 from an acceptable temperature of the engine 10 prior to light-off. As illustrated, the acceptable temperature of the engine 10 prior to light-off may be obtained from the temperature profile 324. For example, the second offset 318 may be from the upper limit 334 of the temperature profile 324. Alternatively, the second offset 318 may be based on the lower limit 332 of the temperature profile 324, or the second offset 318 may be based on an average of the upper limit 334 and lower limit 332. By way of a specific and non-limiting example, the second offset 318 is set to approximately 250 degrees Celsius. By way of another specific and non-limiting example, the second offset 318 is set somewhere in the range of 100 degrees Celsius and 300 degrees Celsius. Other values for the second offset 318 are contemplated.

In some embodiments, the inter-turbine temperature threshold 304 is determined from the temperature profile 324 based on at least one of a frequency of occurrence of an abnormal engine start, tolerance of components of the engine 10 and at least one of the offsets 312, 318.

The frequency of occurrence of an abnormal engine start refers to a probability of the engine 10 having an abnormal engine start. The frequency of occurrence of an abnormal engine start may be determined from measuring engine starts and/or computer simulation. For example, if the frequency of occurrence of an abnormal engine start is less than 0.1%, a larger offset for the second offset 318 from the temperature profile 324 may be used compared to when a frequency of occurrence is greater than 0.1%. By way of another example, if the engine 10 has a frequency of occurrence less than 1%, a larger offset for the second offset 318 from the temperature profile 324 may be used compared to when a frequency of occurrence is greater than 1%. Other values are contemplated, depending on implementation of the engine 10.

Tolerance of components of the engine 10 refers to a permissible limit of one or more components of the engine 10 prior to distress, damage and/or failure. The tolerance of components may be known based on the components used to build the engine 10 or may be determined from measurements and/or computer simulations. For example, if it is known that a certain component of the engine 10 may be damaged at 650 degrees Celsius and that prior to light-off an acceptable engine start would likely not exceed 200 degrees Celsius, then the second offset 318 may be set to 250 degrees Celsius. By way of another example, if it is known that a certain component of the engine 10 may be damaged at 700 degrees Celsius and that prior to light-off an acceptable engine start would likely not exceed 220 degrees Celsius, then the second offset 318 may be set to 300 degrees Celsius. Other values are contemplated, depending on implementation of the engine 10.

While the inter-turbine temperature threshold 304 is illustrated as a constant value 308 in the first range 310 of engine rotational speeds, in other embodiments the inter-turbine temperature threshold 304 may vary in value over the first range 310 of engine rotational speeds.

In some embodiments, the inter-turbine temperature threshold depends on a time parameter. The inter-turbine temperature threshold may comprise one or more temperature values, each having a corresponding duration associated thereto. As such, in this example, the inter-turbine temperature threshold is exceeded if the inter-turbine temperature of the engine 10 exceeds a specific one of the one or more temperate values for the corresponding duration of that specific temperature value.

With reference to Table 1, an example inter-turbine temperature threshold is shown associated with corresponding durations. As shown, the inter-turbine temperature threshold is deemed exceeded when the inter-turbine temperature is measured at 500 degrees Celsius or greater for at least 30 seconds. The inter-turbine temperature threshold is deemed exceed when the inter-turbine temperature is measured at 600 degrees Celsius or greater for at least 15 seconds.

TABLE 1

Inter-turbine temperature threshold based on time

| Temperature | Duration |
| --- | --- |
| 500 degrees Celsius | 30 seconds |
| 600 degrees Celsius | 15 seconds |

Accordingly, the inter-turbine temperature threshold may have a first minimum temperature value for a first minimum duration and a second minimum temperature value for a second minimum duration, where the first and second minimum temperature values are different from each other. The first minimum temperature value is exceeded when the inter-turbine temperature is measured at or above the first minimum temperature for at least the first minimum duration. Similarly, the second minimum temperature value is exceeded when the inter-turbine temperature is measured at or above the second minimum temperature for at least the second minimum duration. The first and second minimum durations may be different from each other. In some embodiments, the first minimum temperature value is lower than the second minimum temperature value and the first minimum duration is longer than the second minimum duration. The number of minimum temperature values may vary depending on practical implementations. For example, a single minimum temperature value having a single minimum duration may be used. In other cases, more than two minimum temperature values each having a respective minimum duration may be used.

The inter-turbine temperature threshold may comprise one or more temperature ranges, each having a corresponding duration associated thereto. As such, in this example, the inter-turbine temperature threshold is exceeded if the inter-turbine temperature of the engine 10 is within a specific one of the one or more temperate ranges for the corresponding duration of that specific temperature range.

With reference to Table 2, another example inter-turbine temperature threshold is shown associated with corresponding durations. As shown, the inter-turbine temperature threshold is deemed exceeded when the inter-turbine temperature is measured within a range of 500 to 600 degrees Celsius for at least 20 seconds. The inter-turbine temperature threshold is deemed exceed when the inter-turbine temperature is measured within a range of 600 to 700 degrees Celsius for at least 15 seconds. The inter-turbine temperature threshold is deemed exceed when the inter-turbine temperature is measured within a range of 700 to 800 degrees Celsius for at least 10 seconds.

TABLE 2

Inter-turbine temperature threshold based on time

| Temperature | Duration |
| --- | --- |
| 500 to 600 degrees Celsius | 20 seconds |
| 600 to 700 degrees Celsius | 15 seconds |
| 700 to 800 degrees Celsius | 10 seconds |

The number of temperature ranges and the corresponding duration may vary depending on practical implementation. For example, the number of temperature ranges may be less than three (e.g., one or two) or more than three. The values for the temperature ranges may also vary depending on practical implementation.

Accordingly, comparing the inter-turbine temperature to the inter-turbine temperature threshold at 204 may comprise comparing the inter-turbine temperature to the inter-turbine temperature threshold for a period of time. For example, the inter-turbine temperature may be monitored and when the inter-turbine temperature exceeds a temperature value or is within a temperature range, a time counter may be started. When the time counter exceeds a corresponding duration associated with the temperature value being exceeded or the temperature range that the inter-turbine temperature is currently in, then it may be determined that the inter-turbine temperature threshold has been exceeded. The time counter may be reset when the inter-turbine temperature falls below the temperature value or falls outside of the temperature range.

In some embodiments, detecting an abnormal start of the engine 10 comprises detecting an abnormal engine start when the inter-turbine temperature exceeds a temperature value of the inter-turbine temperature threshold for a duration. For example, if the inter-turbine temperature is above 500 degrees Celsius for at least 30 seconds, an abnormal engine start may be detected. By way of another example, if the inter-turbine temperature is above 600 degrees Celsius for at least 15 seconds, an abnormal engine start may be detected.

In some embodiments, detecting an abnormal start of the engine 10 comprises detecting an abnormal engine start when the inter-turbine temperature is within a temperature range of the inter-turbine temperature threshold for a duration. For example, if the inter-turbine temperature is within 500 to 600 degrees Celsius for at least 20 seconds, an abnormal engine start may be detected. By way of another example, if the inter-turbine temperature is within 600 to 700 degrees Celsius for at least 15 seconds, an abnormal engine start may be detected.

Figure 4:
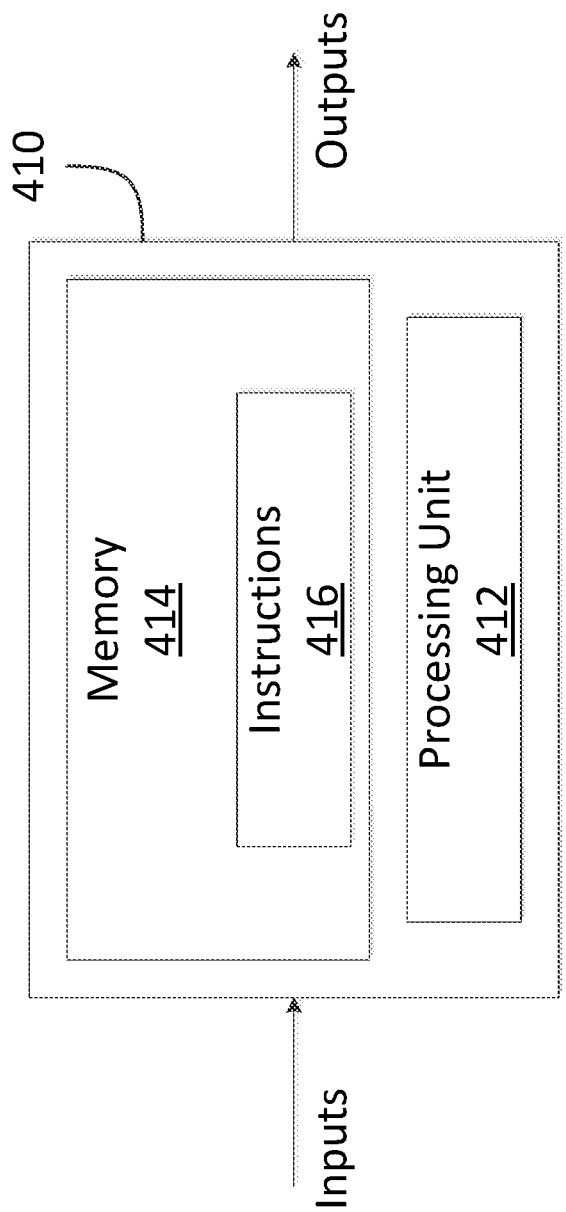
FIG. 4 is a block diagram of an example computing device for implementing the method of FIG. 2.

The method 200 may be implemented by a control system. With reference to FIG. 4, the control system may be implemented by a computing device 410, comprising a processing unit 412 and a memory 414 which has stored therein computer-executable instructions 416. The processing unit 412 may comprise any suitable devices configured to implement the method 200 such that instructions 416, when executed by the computing device 410 or other programmable apparatus, may cause the functions/acts/steps performed as part of the method 200 as described herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412. Note that the control system can be implemented as part of a full-authority digital engine controls (FADEC) or other similar device, including electronic engine control (EEC), engine control unit (EUC), and the like.

The methods and systems for detecting an abnormal engine start of an engine described herein may be implemented in a high level procedural or object oriented programming or scripting language, or a combination thereof, to communicate with or assist in the operation of a computer system, for example the computing device 410. Alternatively, the methods and systems detecting an abnormal engine start of an engine may be implemented in assembly or machine language. The language may be a compiled or interpreted language. Program code for implementing the methods and systems for detecting an abnormal engine start of an engine may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for detecting an abnormal engine start of an engine may also be considered to be implemented by way of a non-transitory computer-readable storage medium having a computer program stored thereon. The computer program may comprise computer-readable instructions which cause a computer, or more specifically the processing unit 412 of the computing device 410, to operate in a specific and predefined manner to perform the functions described herein, for example those described in the method 200.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for detecting an abnormal engine start of an engine may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for detecting an abnormal engine start of a gas turbine engine, the method comprising:
   obtaining a temperature profile of the gas turbine engine, the temperature profile defining temperatures for the engine during engine start over a range of altitudes and ambient temperatures;
   obtaining, during engine start, one or more temperature measurements from a temperature measurement device located on the gas turbine engine, the one or more temperature measurements indicative of an inter-turbine temperature;

comparing the inter-turbine temperature to an inter-turbine temperature threshold which depends on at least one additional parameter and is offset from an upper limit of the temperature profile;

detecting the abnormal engine start when the inter-turbine temperature exceeds the threshold; and shutting down the engine in response to detecting the abnormal engine start.

2. The method of claim 1, wherein the at least one additional parameter is engine rotational speed and the inter-turbine temperature threshold depends on the engine rotational speed.

3. The method of claim 2, wherein comparing the inter-turbine temperature to the inter-turbine temperature threshold comprises comparing the inter-turbine temperature to a constant value when the engine rotational speed is within a range of engine rotational speeds.

4. The method of claim 3, wherein an endpoint of the range of engine rotational speeds is based on an offset from an expected light-off engine rotational speed.

5. The method of claim 3, wherein an endpoint of the range of engine rotational speeds is based on an offset from an expected engine rotational speed where fuel is introduced into the engine.

6. The method of claim 3, wherein the constant value of the inter-turbine temperature threshold is based on an offset from an expected temperature of the engine prior to light-off.

7. The method of claim 1, wherein the inter-turbine temperature threshold is determined from the temperature profile based on at least one of a frequency of occurrence of the abnormal engine start and tolerance of components of the engine.

8. The method of claim 1, wherein the at least one additional parameter is a time parameter, wherein comparing the inter-turbine temperature to the inter-turbine temperature threshold comprises comparing the inter-turbine temperature to the inter-turbine temperature threshold for a duration and wherein detecting the abnormal engine start comprises detecting the abnormal engine start when the inter-turbine temperature exceeds the inter-turbine temperature threshold for the duration.

9. The method of claim 8, wherein the inter-turbine temperature threshold comprises a first minimum temperature value for a first minimum duration and a second minimum temperature value for a second minimum duration, the first minimum temperature value being lower than the second minimum temperature value and the first minimum duration being longer than the second minimum duration.

10. A system for detecting an abnormal engine start of a gas turbine engine, the system comprising:

a processing unit; and a non-transitory computer-readable memory having stored thereon program instructions executable by the processing unit for:

obtaining a temperature profile of the gas turbine engine, the temperature profile defining temperatures for the engine during engine start over a range of altitudes and ambient temperatures;

obtaining, during engine start, one or more temperature measurements from a temperature measurement device located on the gas turbine engine, the one or more temperature measurement indicative of an inter-turbine temperature;

comparing the inter-turbine temperature to an inter-turbine temperature threshold which depends on at least one additional parameter and is offset from an upper limit of the temperature profile;

detecting the abnormal engine start when the inter-turbine temperature exceeds the threshold; and shutting down the engine in response to detecting the abnormal engine start.

11. The system of claim 10, wherein the at least one additional parameter is engine rotational speed and the inter-turbine temperature threshold depends on the engine rotational speed.

12. The system of claim 11, wherein comparing the inter-turbine temperature to the inter-turbine temperature threshold comprises comparing the inter-turbine temperature to a constant value when the engine rotational speed of the engine is within a range of engine rotational speeds.

13. The system of claim 12, wherein an endpoint of the range of engine rotational speeds is based on an offset from an expected light-off engine rotational speed of the engine.

14. The system of claim 12, wherein an endpoint of the range of engine rotational speeds is based on an offset from an expected engine rotational speed where fuel is introduced into the engine.

15. The system of claim 12, wherein the constant value of the inter-turbine temperature threshold is based on an offset from an expected acceptable temperature of the engine prior to light-off.

16. The system of claim 10, wherein the inter-turbine temperature threshold is determined from the temperature profile based on at least one of a frequency of occurrence of the abnormal engine start and tolerance of components of the engine.

17. The system of claim 10, wherein the at least one additional parameter is a time parameter, wherein comparing the inter-turbine temperature to the inter-turbine temperature threshold comprises comparing the inter-turbine temperature to the inter-turbine temperature threshold for a duration and wherein detecting the abnormal engine start comprises detecting the abnormal engine start when the inter-turbine temperature exceeds the inter-turbine temperature threshold for the duration.

18. The system of claim 17, wherein the inter-turbine temperature threshold comprises a first minimum temperature value for a first minimum duration and a second minimum temperature value for a second minimum duration, the first minimum temperature value being lower than the second minimum temperature value and the first minimum duration being longer than the second minimum duration.

* * * * *